United States Patent
Moriyama et al.

(10) Patent No.: US 7,328,939 B2
(45) Date of Patent: Feb. 12, 2008

(54) SEAT ASSEMBLY FOR VEHICLE

(75) Inventors: Genta Moriyama, Anjo (JP); Naoaki Hoshihara, Ohbu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 299 days.

(21) Appl. No.: 10/739,148

(22) Filed: Dec. 19, 2003

(65) Prior Publication Data

US 2005/0035621 A1   Feb. 17, 2005

(30) Foreign Application Priority Data

Dec. 19, 2002   (JP) .............................. 2002-368491

(51) Int. Cl.
*A47C 9/06*   (2006.01)

(52) U.S. Cl. ................. 297/15; 297/362.11; 297/344.1; 297/330

(58) Field of Classification Search ................. 297/331, 297/334, 335, 15, 378.1, 362.11, 378.12, 297/344.1, 330; 296/66, 65.09, 65.01
See application file for complete search history.

(56) References Cited

U.S. PATENT DOCUMENTS

| | | | | |
|---|---|---|---|---|
| 4,285,545 A | * | 8/1981 | Protze | 297/483 |
| 5,195,795 A | * | 3/1993 | Cannera et al. | 296/65.09 |
| 5,269,581 A | * | 12/1993 | Odagaki et al. | 296/66 |
| 5,328,238 A | * | 7/1994 | Yamazaki | 297/332 |
| 5,383,699 A | * | 1/1995 | Woziekonski et al. | 296/65.09 |
| 5,570,931 A | * | 11/1996 | Kargilis et al. | 297/378.12 |
| 5,597,205 A | * | 1/1997 | Glance et al. | 297/362.14 |
| 5,839,773 A | | 11/1998 | Ban et al. | |
| 5,868,451 A | * | 2/1999 | Uno et al. | 296/66 |
| 6,050,629 A | * | 4/2000 | Bernhardt et al. | 296/65.01 |
| 6,070,934 A | * | 6/2000 | Schaefer et al. | 297/14 |
| 6,106,046 A | * | 8/2000 | Reichel | 296/65.09 |
| 6,234,553 B1 | * | 5/2001 | Eschelbach et al. | 296/65.14 |
| 6,270,141 B2 | * | 8/2001 | Moon et al. | 296/65.17 |
| 6,435,589 B2 | * | 8/2002 | Shimizu et al. | 296/65.09 |
| 6,439,636 B1 | * | 8/2002 | Kuo | 296/65.09 |
| 6,464,297 B2 | * | 10/2002 | Garrido et al. | 297/354.13 |
| 6,644,730 B2 | * | 11/2003 | Sugiura et al. | 297/15 |
| 6,793,285 B1 | * | 9/2004 | Tame | 297/336 |
| 6,869,138 B2 | * | 3/2005 | Rhodes et al. | 297/15 |

FOREIGN PATENT DOCUMENTS

| | | |
|---|---|---|
| DE | 101 01 117 A1 | 7/2002 |
| EP | 0 365 175 A | 4/1990 |
| EP | 0 990 551 A | 4/2000 |
| JP | 11-48840 A | 2/1999 |

OTHER PUBLICATIONS

German Patent Office Official Letter and English Translation.

* cited by examiner

*Primary Examiner*—David Dunn
*Assistant Examiner*—Erika Garrett
(74) *Attorney, Agent, or Firm*—Buchanan Ingersoll & Rooney PC

(57) ABSTRACT

A seat assembly for a vehicle includes a seatback, a seat cushion, a link mechanism for supporting the seat cushion, and a drive unit for driving the link mechanism and moving the seat cushion between a seating position and a stowed position. When the seat cushion is moved between the seating position and the stowed position, the seat cushion and the seatback keep a constant posture by an operation of the link mechanism and the drive unit.

17 Claims, 4 Drawing Sheets

SEAT ASSEMBLY FOR VEHICLE

This application is based on and claims priority under 35 U.S.C. § 119 with respect to Japanese Application No. 2002-368491 filed on Dec. 19, 2002, the entire contents of which are incorporated herein by reference.

FIELD OF THE INVENTION

This invention generally relates to a seat assembly for a vehicle. More particularly, the present invention pertains to a seat assembly for a vehicle which is retractable and stored within a storage space formed in a vehicle floor when the seat is not intended to be used.

BACKGROUND OF THE INVENTION

A known seat assembly is disclosed in Japanese Patent Laid-Open Publication No. 11-48840. According to the disclosed seat assembly that is retractable and stored within a concave portion formed in a vehicle floor, a seatback is folded on a seat cushion from a seating position and a lock device engaging the seat with the vehicle floor is released so that the seat assembly is retractable. Then, a user moves the seat manually into the concave portion to store.

According to the disclosed seat assembly, a complicated operation is required in a specified order for storing the seat within the concave portion. In addition, the seat has not been configured to keep a constant posture in process of being stored within the storage space and thus a user is required to support a portion of the weight of the seat and carefully proceed the operation of storing.

Thus, a need exists for a seat assembly for a vehicle that is easily retracted within the space in the vehicle floor and returned to a seating position so that a burden on a user is reduced.

SUMMARY OF THE INVENTION

According to an aspect of the present invention, a seat assembly for a vehicle includes a seatback, a seat cushion, a link mechanism for supporting the seat cushion, and a drive unit for driving the link mechanism and moving the seat cushion between a seating position and a stowed position. When the seat cushion is moved between the seating position and the stowed position, the seat cushion and the seatback keep a constant posture by an operation of the link mechanism and the drive unit.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

A first embodiment of the present invention is explained referring to FIGS. 1 to 4.

Figure 1:
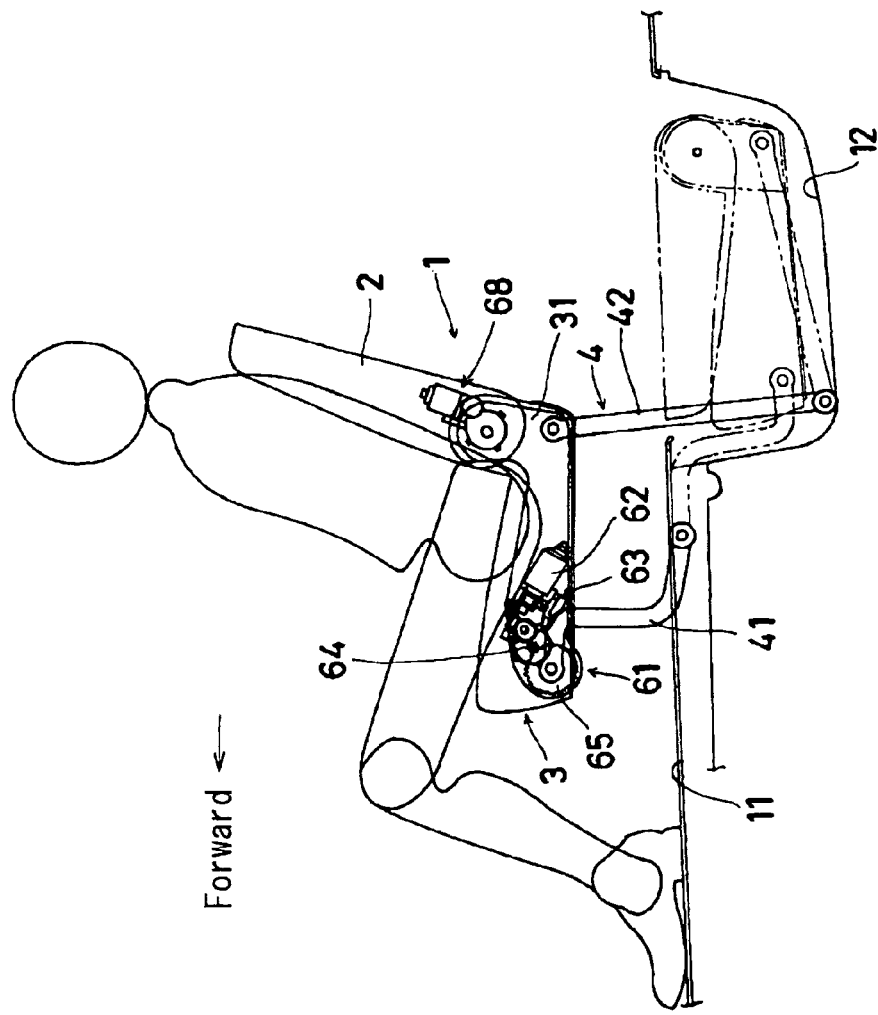
FIG. 1 is a perspective side view of a seat assembly according to a first embodiment of the present invention.

As shown in FIG. 1, a seat assembly 1 includes a seatback 2 and a seat cushion 3.

Figure 2:
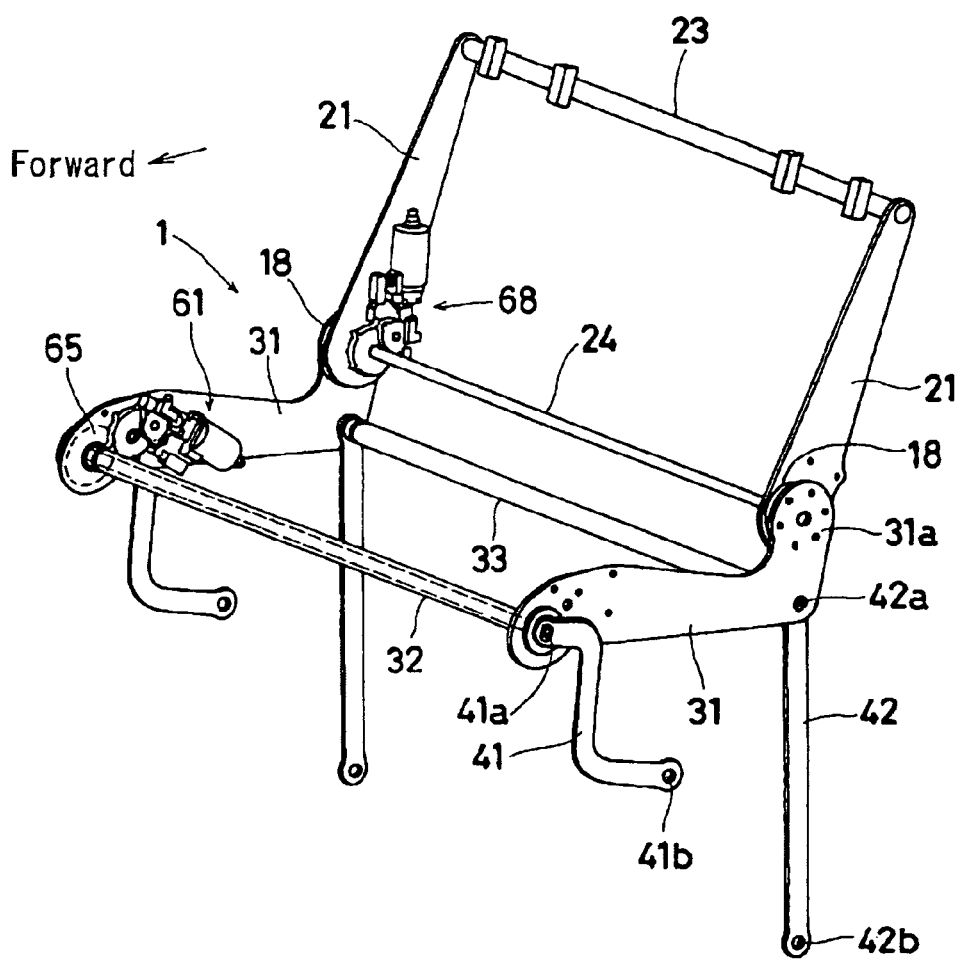
FIG. 2 is a perspective view of the seat assembly according to the first embodiment of the present invention.

The seat cushion 3 includes a pair of cushion side frames 31 provided on right and left sides in FIG. 2. The cushion side frames 31 each extend substantially horizontally in a vehicle longitudinal direction (in leftward direction in FIG. 1 and FIG. 2). Front end portions of the respective cushion side frames 31 are connected with each other via a front connecting pipe 32 while rear end portions of the respective cushion side frames 31 are connected with each other via a rear connecting pipe 33. Therefore, the strength of the seat cushion 3 is assured.

Each cushion side frame 31 is formed by a projecting portion 31a at the rear end portion, the projecting portion 31a extending upwardly in FIG. 2. A pair of backside frames 21 provided on right and left sides of the seatback 2 are attached to the respective projecting portions 31a via a pair of angle adjustable mechanisms 18 provided on right and left sides in FIG. 2 and having a known structure as incorporating each planetary gear mechanism (not shown). The angle adjustable mechanisms 18 are connected with each other via an interlocking rod 24, operating simultaneously with each other. A second drive unit 68 is attached to one of the backside frames 21 for driving the angle adjustable mechanisms 18. The second drive unit 68 includes a motor and a deceleration mechanism, which is a same structure as a first drive unit 61 (to be mentioned later). An angle of incline of the seatback 2 is adjustable by operating the second drive unit 68 to drive the respective planetary gear mechanisms of the angle adjustable mechanisms 18. The backside frames 21 are connected with each other via an upper connecting pipe 23 at each upper portion, thereby assuring the strength of the seatback 2.

As shown in FIG. 1, a link mechanism 4 extending in downward direction is attached to the cushion side frames 31. As shown in FIG. 2, the link mechanism 4 includes a pair of front links 41 provided on front right and left sides of the cushion side frames 31 and a pair of rear links 42 provided on rear right and left sides of the cushion side frames 31. Upper end portions of the respective front links 41 are rotatably connected to the cushion side frames 31 via a rotational shaft 41a. In the same way, upper end portions of the respective rear links 42 are rotatably connected to the cushion side frames 31 via a rotational shaft 42a. Further, lower end portions of the respective front links 41 are rotatably connected to a floor 11 via a rotational shaft 41b while lower end portions of the respective rear links 42 are rotatably connected to the floor 11 via a rotational shaft 42b. The rotational shaft 41a is positioned within the front connecting pipe 32 for connecting the front links 41 provided on right and left sides of the cushion side frames 31, thereby operating the front links 41 simultaneously with each other.

Figure 3:
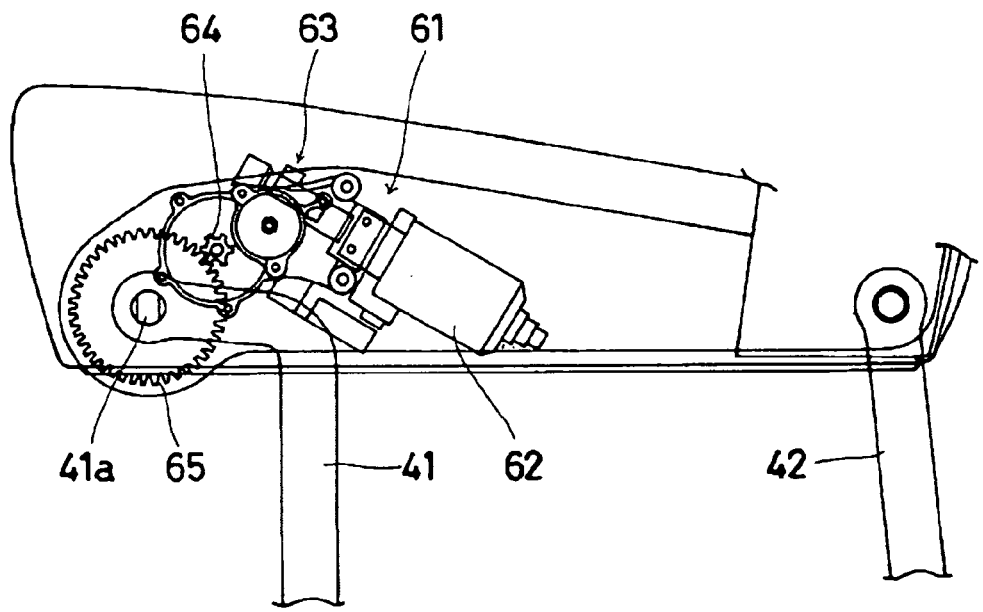
FIG. 3 is an enlarged view of a portion of FIG. 2.

The first drive unit 61 is attached to one of the cushion side frames 31 as shown in FIGS. 2 and 3. The first drive unit 61 includes a motor 62, a deceleration mechanism 63 and a pinion 64, which is rotated by the motor 62 and the deceleration mechanism 63. A gear 65 is fixed to the rotational shaft 41a and engages with the pinion 64. According to the aforementioned structure, the front links 41 rotate relative to the cushion side frames 31.

As is seen from FIG. 1, the pair of front links 41 and the pair of rear links 42 constitute a four-link mechanism by being connected with one another via the rotational shafts 41a, 42a, 41b, and 42b along with the cushion side frames 31 and the floor 11. Further, as shown in FIG. 1, a concave portion 12 is formed in the floor 11, denting relative to the other floor surface. Under the four-link mechanism, the cushion side frames 31 move with keeping a constant posture thereof when the front links 41 rotate relative to the floor 11. Then, when the front links 41 rotate to reach a position indicated by a chain double-dashed line in FIG. 1, the cushion side frames 31 and the rear links 42 each rotate to reach a predetermined position indicated by the chain double-dashed line in FIG. 1. The seat assembly 1 is thus stored within the concave portion 12.

Figure 4:
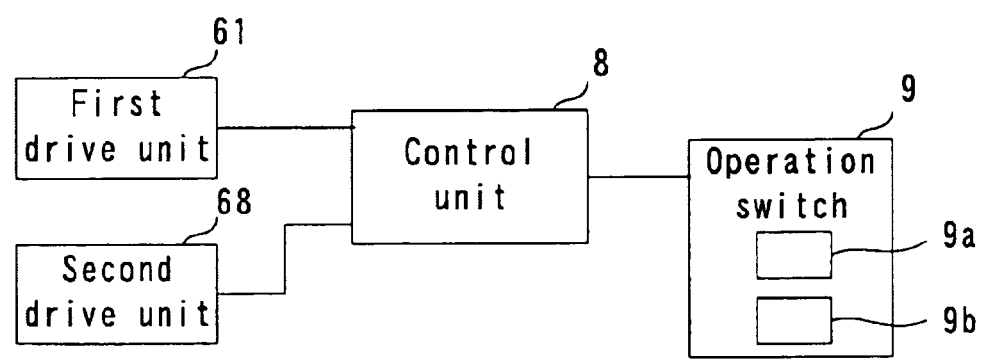
FIG. 4 is a block view of a control system of the seat assembly according to the first embodiment of the present invention.

As shown in FIG. 4, the first drive unit 61 and the second drive unit 68 are electrically connected to a control unit 8 and an operation switch 9. The operation of each first and second drive units 61 and 68 is determined by an operation condition of the operation switch 9.

An operation of the seat assembly 1 being structured in the aforementioned manner is explained as follows.

When an occupant sitting on the seat tries to adjust the angle of incline of the seatback 2 so as to fit to. the posture of the occupant, the seatback 2 inclines forward or rearward by driving the second drive unit 68 by means of an angle adjustable switch 9a.

When the seat assembly 1 is retracted and stored within the concave portion 12 so that a space in the floor 11 that has been occupied by the seat assembly 1 can be utilized for a cargo area, a storage switch 9b is operated on storing side. The control unit 8 activates the first drive unit 61. Then, the seat assembly 1 moves to be stored within the concave portion 12. At the same time, the control unit 8 activates the second drive unit 68 so that the seatback 2 is folded on the seat cushion 3, i.e. the seatback 2 moves in the forward direction in FIGS. 1 and 2. The seat assembly 1 is completely stored within the concave portion 12 in a manner indicated by the chain double-dashed line in FIG. 1. When the seat assembly 1 is returned to a seating position from the stowed position, i.e. the position at which the seat assembly 1 is stored within the concave portion 12, the storage switch 9b is operated on returning side.

Since the seat assembly 1 maintains a constant posture thereof due to an operation of the link mechanism 4 even when the seat assembly 1 moves between the stowed position and the seating position, a user is not required to support a part of the weight of the seat assembly 1 and thus can operate the seat assembly 1 at a position apart therefrom. Further, a complicated operation procedure is not required and a simple operation of the seat assembly 1 is attained.

A second embodiment of the present invention is explained as follows.

Figure 5:
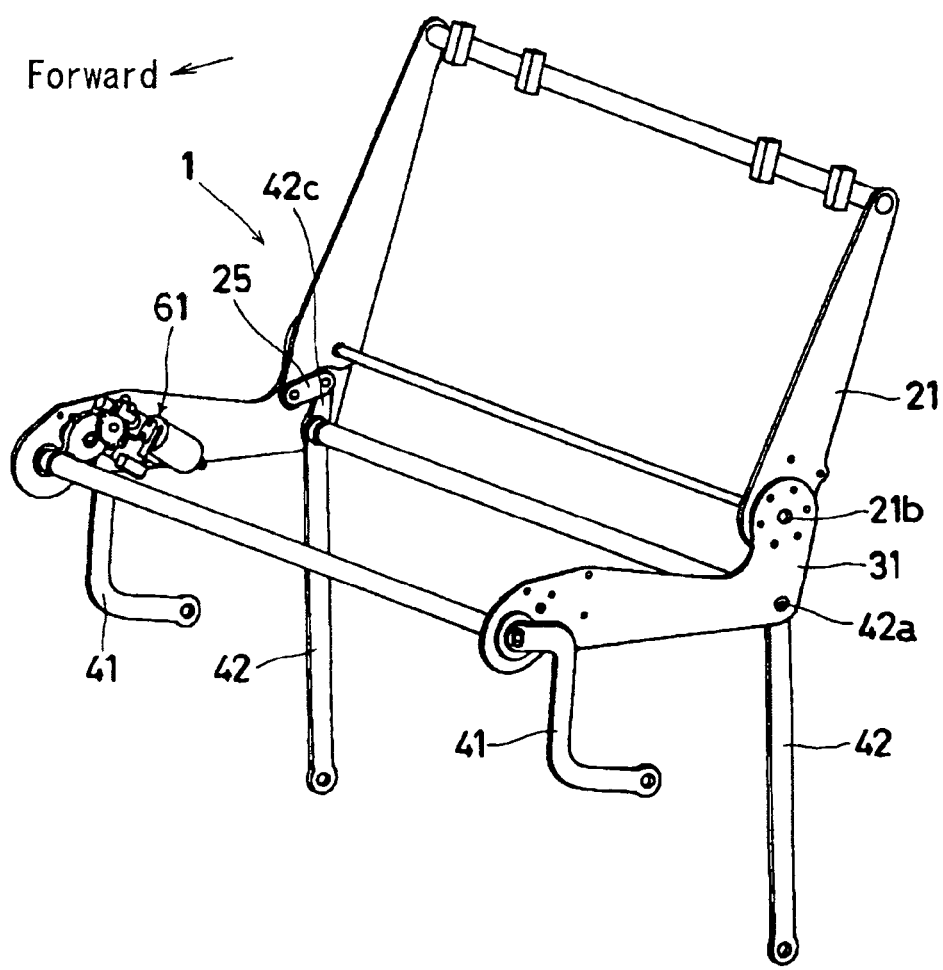
FIG. 5 is a perspective view of a seat assembly according to a second embodiment of the present invention.

As shown in FIG. 5, the pair of rear links 42 of the seat assembly 1 according to the second embodiment includes extending portions 42c respectively each extending upward relative to the rotational shaft 42a. An upper end portion of each extending portion 42c is connected to a lower end portion of the backside frame 21 via a connecting link 25. According to the second embodiment, the second drive unit 68, which is provided in the first embodiment, is not used. The first drive unit 61 is driven to operate the front links 41 along with the rear links 42, thereby rotating the backside frames 21 relative to a rotational shaft 21b, i.e. the backside frames 21 are folded in the forward direction in FIG. 5. In the same way as the first embodiment shown in FIG. 1, the seat assembly 1 can move between the seating position indicated by the solid line in FIG. 1 and the stowed position indicated by the chain double-dashed line without any support by a user. According to the seat assembly 1 of the second embodiment, the angle of incline of the seatback 2 is not adjustable since the seat angle adjustable feature is not equipped. However, the seat assembly 1 is feasible with a simple structure that is retractable and stored within the concave portion 12 in the floor 11.

According to the aforementioned structure of the present invention, a complicated procedure in a specified order is not required. In addition, a user is not required to support the seat in process of storing so that the constant posture of the seat can be maintained. Therefore, the seat can be easily moved to the storage space or returned to the seating position by the switch operation, thereby reducing the burden on the user.

Further, according to the above-mentioned structure of the present invention, the seat assembly is feasible with less number of the drive units and thus a cost is reduced.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat assembly for a vehicle comprising:
a seatback;
a seat cushion;
a four-link mechanism for supporting the seat cushion;
a drive unit for driving the four-link mechanism and moving the seat cushion between a seating position and a stowed position; wherein when the seat cushion is moved between the seating position and the stowed position, support of the seat cushion is maintained by operation of the four-link mechanism and the drive unit; and
a control unit for operating the drive unit, wherein the drive unit includes a first drive unit for moving the seat cushion into the stowed position and a second drive unit for moving the seatback, and the first drive unit and the second drive unit are electrically connected to said control unit and operate in association with each other for simultaneously operating the seat cushion and the seatback.

2. A seat assembly according to claim 1, wherein the first drive unit is attached to one of cushion side frames forming the seat cushion and the second drive unit is attached to one of backside frames forming the seatback.

3. A seat assembly according to claim 2, wherein the four-link mechanism includes a first pair of links rotatably connected to the respective cushion side frames via a first rotational shaft and to a vehicle floor via a second rotational shaft, and a second pair of links rotatably connected to the respective cushion side frames via a third rotational shaft and to the vehicle floor via a fourth rotational shaft.

4. A seat assembly according to claim 3, wherein the first pair of links are connected with each other via the first rotational shaft.

5. A seat assembly according to claim 4, wherein the first drive unit includes a first motor and a first deceleration mechanism and the second drive unit includes a second motor and a second deceleration mechanism.

6. A seat assembly according to claim 5, wherein the first drive unit further includes a pinion which is rotated by the first motor and the first deceleration mechanism and which engages with a gear fixed to the first rotational shaft.

7. A seat assembly according to claim 1, wherein the seatback is positioned on top of the seat cushion when the seat cushion is in the stowed position.

8. A seat assembly for a vehicle comprising:
a seatback;
a seat cushion;
a link mechanism supporting the seat cushion; and
a motor-operated drive unit for driving the link mechanism and moving the seat cushion between a seating position and a stowed position, wherein when the seat cushion is moved between the seating position and the stowed position, support of the seat cushion is maintained by operation of the link mechanism and the drive unit; and
a control unit for operating the motor-operated drive unit, wherein the drive unit includes a first drive unit for moving the seat cushion into the stowed position and a second drive unit for moving the seatback, and the first drive unit and the second drive unit operate in association with each other for simultaneously operating the seat cushion and the seatback.

9. A seat assembly according to claim 8, wherein the first drive unit is attached to one of plural cushion side frames forming the seat cushion and the second drive unit is attached to one of plural backside frames forming the seatback.

10. A seat assembly according to claim 9, wherein the link mechanism is a four-link mechanism and includes a first pair of links rotatably connected to the respective cushion side frames via a first rotational shaft and to a vehicle floor via a second rotational shaft, and a second pair of links rotatably connected to the respective cushion side frames via a third rotational shaft and to the vehicle floor via a fourth rotational shaft.

11. A seat assembly according to claim 10, wherein the first pair of links are connected with each other via the first rotational shaft.

12. A seat assembly according to claim 11, wherein the first drive unit includes a first motor and a first deceleration mechanism and the second drive unit includes a second motor and a second deceleration mechanism.

13. A seat assembly according to claim 12, wherein the first drive unit further includes a pinion which is rotated by the first motor and the first deceleration mechanism and which engages with a gear fixed to the first rotational shaft.

14. A seat assembly according to claim 8, wherein the seatback is positioned on top of the seat cushion when the seat cushion is in the stowed position.

15. A seat assembly, for a vehicle comprising:
a seatback;
a seat cushion;
a link mechanism supporting the seat cushion; and
a motor-operated drive unit for driving the link mechanism and moving the seat cushion between a seating position and a stowed position, wherein when the seat cushion is moved between the seating position and the stowed position, support of the seat cushion is maintained by operation of the link mechanism and the drive unit; and
wherein the link mechanism is a four-link mechanism and includes a first link mechanism for moving the seat cushion and a second link mechanism for simultaneously moving the first link mechanism and the seatback;
wherein the first link mechanism includes a first pair of links rotatably connected to the seat cushion via a first rotational shaft and to a vehicle floor via a second rotational shaft, and a second pair of links rotatably connected to the seat cushion via a third rotational shaft and to the vehicle floor via a fourth rotational shaft.

16. A seat assembly according to claim 15, wherein the second link mechanism connects the seatback and the second pair of links.

17. A seat assembly according to claim 15, wherein the seatback is positioned on top of the seat cushion when the seat cushion is in the stowed position.

* * * * *